United States Patent
Yoo et al.

(10) Patent No.: US 10,540,768 B2
(45) Date of Patent: Jan. 21, 2020

(54) APPARATUS AND METHOD TO SEGMENT OBJECT FROM IMAGE

(71) Applicants: Samsung Electronics Co., Ltd., Suwon-si, Gyeonggi-do (KR); Institute of Automation Chinese Academy of Sciences, Beijing (CN)

(72) Inventors: Byungin Yoo, Seoul (KR); Jungbae Kim, Seoul (KR); Chang Kyu Choi, Seongnam-si (KR); Jaejoon Han, Seoul (KR); Yongzhen Huang, Beijing (CN); Liang Wang, Beijing (CN)

(73) Assignees: SAMSUNG ELECTRONICS CO., LTD., Gyeonggi-Do (KR); INSTITUTE OF AUTOMATION CHINESE ACADEMY OF SCIENCES, Beijing (CN)

( * ) Notice: Subject to any disclaimer, the term of this patent is extended or adjusted under 35 U.S.C. 154(b) by 34 days.

(21) Appl. No.: 15/217,141

(22) Filed: Jul. 22, 2016

(65) Prior Publication Data

US 2017/0091951 A1    Mar. 30, 2017

(30) Foreign Application Priority Data

Sep. 30, 2015  (KR) .................. 10-2015-0137782
Feb. 25, 2016  (KR) .................. 10-2016-0022517

(51) Int. Cl.
*G06T 7/11* (2017.01)

(52) U.S. Cl.
CPC .................... *G06T 7/11* (2017.01)

(58) Field of Classification Search
CPC ......... G06T 7/0089; G06T 2207/20081; G06T 7/11; G06T 2207/20084; G06T 7/143; G06T 7/10; G06T 7/194; G06T 7/40; G06T 2207/30232; G06T 7/0097; G06T 7/136; G06T 7/33; G06T 7/35; G06K 9/66; G06K 9/6267; G06K 9/00147; G06K 9/0014; G06K 9/6256; G06K 9/3233

See application file for complete search history.

(56) References Cited

U.S. PATENT DOCUMENTS

| | | | | |
|---|---|---|---|---|
| 8,953,843 | B1* | 2/2015 | Kwan | G06K 9/00771 |
| | | | | 382/103 |
| 9,715,743 | B2* | 7/2017 | Kasahara | G06T 11/00 |
| 2001/0036229 | A1* | 11/2001 | Chen | H04N 9/75 |
| | | | | 375/240.08 |

(Continued)

FOREIGN PATENT DOCUMENTS

| | | |
|---|---|---|
| CN | 104517122 A | 4/2015 |
| JP | 4845755 B2 | 12/2011 |

OTHER PUBLICATIONS

Zhang et al., "Image Segmentation Evaluation: A Survey of Unsupervised Methods," Jul. 1, 2008.

(Continued)

*Primary Examiner* — Jingge Wu
(74) *Attorney, Agent, or Firm* — Harness, Dickey & Pierce, P.L.C.

(57) ABSTRACT

A method of segmenting an object from an image includes receiving an input image including an object; generating an output image corresponding to the object from the input image using an image model; and extracting an object image from the output image.

18 Claims, 18 Drawing Sheets

(56) References Cited

U.S. PATENT DOCUMENTS

| | | | |
|---|---|---|---|
| 2003/0072484 A1* | 4/2003 | Kokko | G06K 9/00127 382/155 |
| 2004/0066970 A1* | 4/2004 | Matsugu | G06K 9/20 382/217 |
| 2004/0190092 A1* | 9/2004 | Silverbrook | G06F 3/03545 358/539 |
| 2007/0019863 A1* | 1/2007 | Ito | G06K 9/00248 382/190 |
| 2011/0182469 A1 | 7/2011 | Ji et al. | |
| 2011/0222724 A1 | 9/2011 | Yang et al. | |
| 2012/0087574 A1* | 4/2012 | Yokono | G06K 9/00288 382/159 |
| 2012/0134581 A1* | 5/2012 | Matsuda | H04N 1/41 382/164 |
| 2013/0279802 A1* | 10/2013 | van der Merwe | G06K 9/00362 382/165 |
| 2014/0003664 A1* | 1/2014 | Umezaki | G06K 9/3208 382/103 |
| 2015/0117760 A1 | 4/2015 | Wang et al. | |
| 2015/0138389 A1 | 5/2015 | Mishra et al. | |
| 2015/0139485 A1 | 5/2015 | Bourdev | |
| 2015/0146917 A1* | 5/2015 | Bernal | G06K 9/00771 382/103 |
| 2015/0363634 A1* | 12/2015 | Yin | G06K 9/00221 382/118 |
| 2017/0200078 A1* | 7/2017 | Bichler | G06N 3/063 |
| 2017/0206440 A1* | 7/2017 | Schrier | G05D 1/021 |

OTHER PUBLICATIONS

Felzenszwalb, "Efficient Graph-Based Image Segmentation," 2004.

Liu et al., "Nonparametric Scene Parsing: Label Transfer via Dense Scene Alignment," 2011.

Ladicky et al., "Associative Hierarchical CRFs for Object Claiss Image Segmentation," 2009.

He et al., "Learning Hybrid Models for Image Annotation with Partially Labeled Data," 2009.

Wu et al., "Early Hierarchical Contexts Learned by Convolutional Networks for Image Segmentation," 2014 22nd International Conference on Pattern Recognition, 2014, IEEE Computer Society.

Luo et al., "Pedestrian Parsing via Deep Decompositional Network," 2013.

Krizhevsky et al., "ImageNet Classification with Deep Convolutional Neural Networks," 2012.

Hinton et al., "Distilling the Knowledge in a Neural Network," 2015.

Zhang, "A Survey on Evaluation Methods for Image Segmentation," 1996.

\* cited by examiner

APPARATUS AND METHOD TO SEGMENT OBJECT FROM IMAGE

CROSS-REFERENCE TO RELATED APPLICATION

This application claims under 35 U.S.C. § 119 to Korean Patent Application No. 10-2015-0137782 filed on Sep. 30, 2015, and Korean Patent Application No. 10-2016-0022517 filed on Feb. 25, 2016, in the Korean Intellectual Property Office, the entire contents of which are incorporated herein by reference in its entirety.

BACKGROUND

1. Field

At least one example embodiment relates generally to image analysis and more specifically to technology for segmenting an object from an image.

2. Description of the Related Art

In an image-related technological field, technology for recognizing an object such as a human face using an image is developing. To recognize an object such as a human face, a portion excluding a background may be extracted from the image.

For example, to extract the portion excluding the background from the image, depth information based object segmentation technology may be used. Such object segmentation technology may segment an object, for example, a human body, from an image by combining color information and depth information. Thus, the technology may use additional module for obtaining the depth information in addition to a camera used to obtain the color information, and may perform an excessive amount of calculation for processing the depth information.

Thus, technology for segmenting an object from an image using color information may be desirable.

SUMMARY

According to at least some example embodiments, a method of segmenting an object from an image includes receiving an input image including an object; generating an output image corresponding to the object from the input image using an image model; and extracting an object image from the output image.

The extracting of the object image may include classifying a first plurality of pixels of the output image based on an attribute of each pixel of the output image; and extracting the object image using the classified pixels.

The classifying may include comparing a pixel value of each pixel from among the first plurality of pixels to a threshold value; and determining the attribute of each pixel from among the first plurality of pixels based on a result of the comparing.

The extracting of the object image may include generating a mask image by determining one of binary values for each pixel of the output image based on a result of comparing a pixel value of each pixel of the output image to a threshold value.

The extracting of the object image may further include generating a foreground image based on the mask image and the input image.

The extracting of the object image may include generating a foreground image based on the output image by comparing a pixel value of each pixel of the output image to a threshold value.

The generating of the output image may include using the image model to generate the object image such that the object image has a resolution equal to that of the input image.

The image model may include a neural network, the neural network may include an activation function, and the activation function may include at least one nonlinear function.

A non-transitory computer readable medium may store instructions that, when executed by a processor, cause the processor to perform the method of segmenting an object from an image.

According to at least some example embodiments, an apparatus for segmenting an object from an image includes a memory storing an image model and computer-readable instructions; and one or more processors configured to execute the instructions such that the one or more processors are configured to receive an input image including an object, generate an output image corresponding to the object from the input image using the image model, and extract an object image from the output image.

The one or more processors may be configured to execute the instructions such that the one or more processors are configured to classify a first plurality of pixels of the output image based on an attribute of each pixel of the output image, and extract the object image using the classified pixels.

The one or more processors may be configured to execute the instructions such that the one or more processors are configured to compare a pixel value of each pixel from among the first plurality of pixels to a threshold value, and determine the attribute of each pixel from among the first plurality of pixels based on a result of the comparing.

The one or more processors may be configured to execute the instructions such that the one or more processors are configured to generate a mask image by determining one of binary values for each pixel of the output image based on a result of comparing a pixel value of each pixel of the output image to a threshold value.

The one or more processors may be configured to execute the instructions such that the one or more processors are configured to generate a foreground image based on the mask image and the input image.

The one or more processors may be configured to execute the instructions such that the one or more processors are configured to generate a foreground image based on the output image by comparing a pixel value of each pixel of the output image to a threshold value.

The one or more processors may be configured to execute the instructions such that the one or more processors are configured to generate of the output image by using the image model to generate the object image such that the object image has a resolution equal to that of the input image.

The image model may include a neural network, the neural network may include an activation function, and the activation function may include at least one nonlinear function.

According to at least some example embodiments, a method of training an image model for segmentation of an object from an image includes receiving a reference training image and a reference object image, the reference training image corresponding to the reference object image, the reference training image including a background and an object; and training a parameter of the image model such that the image model outputs an output image that indicates the reference object image, based on receiving, as input to the image model, the reference training image, the reference object image being an image would result from segmenting the object from the reference training image.

The image model may include a neural network, the neural network may include an activation function, and the activation function may include at least one of nonlinear function, and the neural network may be configured to generate the output image such that a resolution of the output image is equal to a resolution of the input image.

The image model may be trained based on an image obtained by performing, on the reference training image, at least one of rotation, resizing, shifting, flipping, and noise addition.

According to at least some example embodiments, a method of segmenting an object from an image includes receiving an input image including an object; generating an intermediate image corresponding to the object from the input image using a first image model; generating an output image corresponding to the object from the intermediate image using a second image model; and extracting an object image from the output image.

According to at least some example embodiments, a method of training an image model for segmentation of an object from an image includes receiving a reference training image and a reference object image, the reference training image corresponding to the reference object image, the reference training image including a background and an object; training a parameter of a first image model such that the first image model allows a processor that uses the first image to generate an intermediate image corresponding to an object included in the reference training image; generating a reference intermediate image from the reference training image using the first image model; and training a parameter of a second image model such that the second image model outputs an output image that indicates the reference object image, based on receiving, as input to the second image model, the reference intermediate image, the reference object image being an image would result from segmenting the object from the reference training image.

According to at least some example embodiments, a method of segmenting an object from an image includes receiving an input image including a background and an object; providing the input image as input to an image model; obtaining, as output of the image model corresponding to the input image, an output image such that each pixel in the output image has a pixel value indicating a probability that a corresponding pixel in the input image is a pixel of the object; and generating an object image based on the output image, the object image being an image that includes the object and excludes the background.

The generating the object image based on the output image may include generating a plurality of comparison results for a first plurality of pixels of the output image by comparing the pixel values of the first plurality of pixels to a threshold value; determining portions of the output image that correspond to the background and portions of the output image that correspond to the object based on the plurality of comparison results; and generating a second plurality of pixels of the object image based on the determining.

The object image may be a mask image and the generating the second plurality of pixels may include generating the second plurality of pixels such that each pixel of the second plurality of pixels has either a first pixel value or a second pixel value, the first pixel value corresponding to the background, the second pixel value corresponding to the object.

The object image may be a foreground image and the generating the second plurality of pixels may include generating the second plurality of pixels such that, each pixel, from among the second plurality of pixels, that corresponds to the background has a first pixel value, and each pixel, from among the second plurality of pixels, that corresponds to the object has a same pixel value as corresponding pixel from among the pixels of the input image.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

Figure 1:
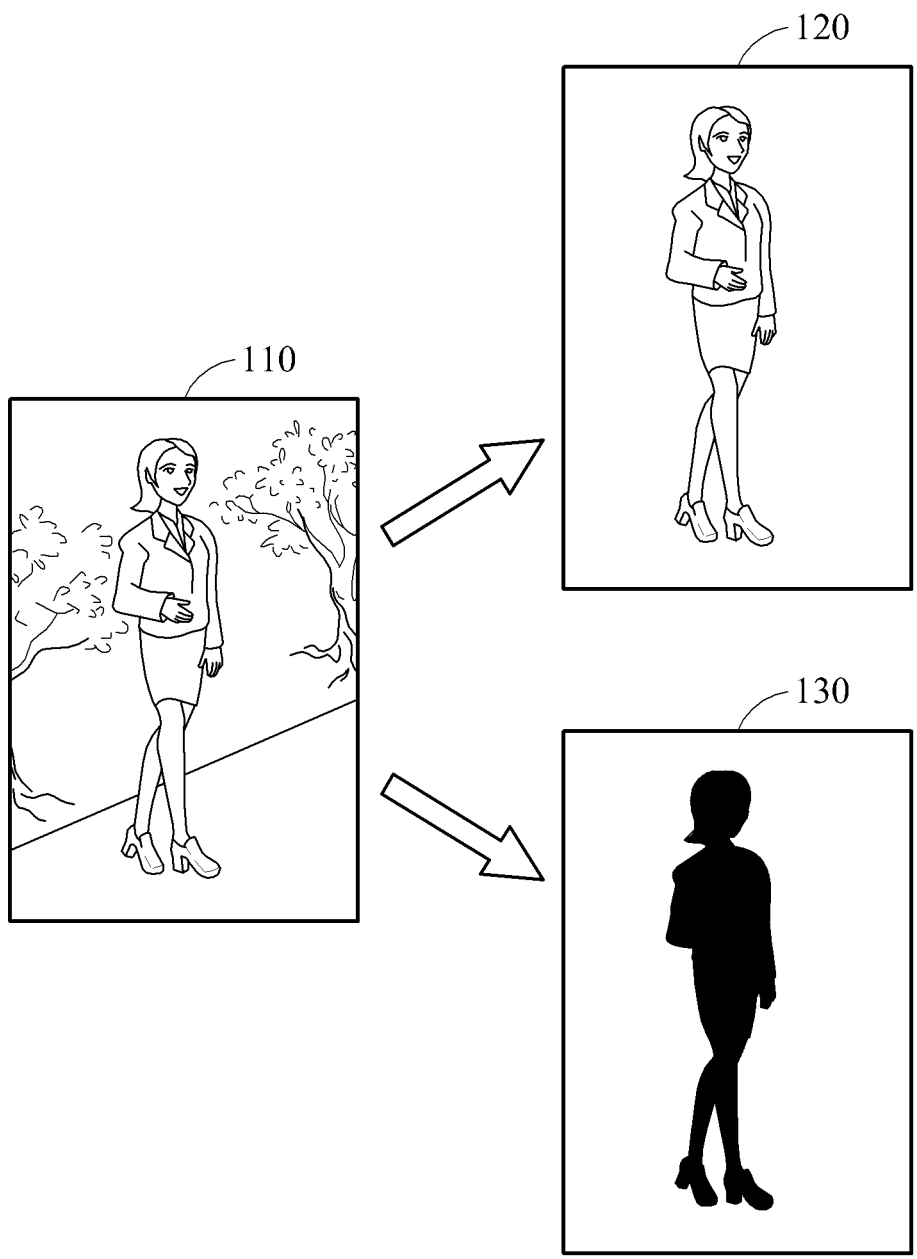
FIG. 1 is a diagram illustrating an example of an object image to be segmented from an image according to at least one example embodiment.

Detailed example embodiments of the inventive concepts are disclosed herein. However, specific structural and functional details disclosed herein are merely representative for purposes of describing example embodiments of the inventive concepts. Example embodiments of the inventive concepts may, however, be embodied in many alternate forms and should not be construed as limited to only the embodiments set forth herein.

Accordingly, while example embodiments of the inventive concepts are capable of various modifications and alternative forms, embodiments thereof are shown by way of example in the drawings and will herein be described in detail. It should be understood, however, that there is no intent to limit example embodiments of the inventive concepts to the particular forms disclosed, but to the contrary, example embodiments of the inventive concepts are to cover all modifications, equivalents, and alternatives falling within the scope of example embodiments of the inventive concepts. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the inventive concepts. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the inventive concepts. As used herein, the singular forms "a", an and the are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments of the inventive concepts are described herein with reference to schematic illustrations of idealized embodiments (and intermediate structures) of the inventive concepts. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

FIG. 1 is a diagram illustrating an example of an object image to be segmented from an image according to at least one example embodiment.

Referring to FIG. 1, an apparatus for segmenting an object from an image according to at least some example embodiments may segment an object image from an input image 110 including an object. An apparatus for segmenting an object from an image is also referred to herein as an object segmenting apparatus. An example structure of the object segmenting apparatus according to at least some example embodiments will be discussed in greater detail below with refers to the object segmenting apparatus 1100 of FIG. 11.

In the descriptions provided herein, the term "object" refers to a subject of an image excluding a background portion of an image. Examples of such a subject include, but are not limited to, a human, an animal, and a thing, or to a portion of human, for example, a face, an arm, a leg, and a physical portion of a human. For ease of description, the object segmenting apparatus according to at least some example embodiments will be described herein primarily with reference to a scenario in which the image includes a person, the subject is the person's body, and the background is the remaining portions of the image (i.e., the portions excluding the body). However at least some example embodiments are not limited to this scenario.

For example, according to at least some example embodiments, the designation between subject and background may differ based on the content of the image and may be defined in accordance with particular information a user of the object segmenting apparatus wishes to obtain. For example, the object segmenting apparatus may be applied to facilitate recognition of one or more particular cars in an image of highway traffic, in which case one or more cars in the traffic image may be the subjects, and the background may be the remaining portions of the traffic image (e.g., street signs, roads, sky, etc.). As another example of the object segmenting apparatus being applied to facilitate recognition of one or more particular cars in an image of highway traffic, one or more license plates in the traffic image may be the subjects, and the background may be the remaining portions of the traffic image (e.g., car bodies, street signs, roads, sky, etc.). As another example, the object segmenting apparatus may be applied to facilitate identification of particular biological attributes, in which case the image may be an image of, for example, an organ, tissue, or cells, (e.g., a picture of a human eye), the subject may be a particular portions of the organ, tissue, or cell image, (e.g., an iris in the image of the eye), and the background may be the remaining portions of the organ, tissue, or cell image (e.g., an eyelid, sclera or pupil in the image of an eye). As another example, the object segmenting apparatus may be applied to facilitate identification of particular medical conditions, in which case the image may be an image of, for example, an organ, tissue, or cells, (e.g., skin), the subjects may be a particular portions of the organ, tissue, or cell image, (e.g., an abnormal or discolored portions of the skin), and the background may be the remaining portions of the organ, tissue, or cell image (e.g., the normal portions of the skin). As another example, the object segmenting apparatus may be applied to facilitate identification of public safety issues, in which case the image may be an image of, for example, a crowd of people at a sporting event (e.g., an image of a crowd of people at a parade or a concert), the subjects may be weapons (e.g., guns), and the background may be the remaining portions of the image (e.g., portions of the image that do not include guns). As another example, the object segmenting apparatus may be applied to facilitate device inspection, in which case the image may be an image of a device (e.g., a microscopic-level, multi-cell, plan view image of a portion of a semiconductor memory device), the subjects may be a particular portions of the device (e.g., abnormal regions in the image of the portion of a semiconductor memory device), and the background may be the remaining portions of the device (e.g., the normal portions in the image of the portion of a semiconductor memory device). Further, though the above-referenced example applications of the object segmenting apparatus according to some example embodiments are provided for ease of understanding, at least some example embodiments are not limited to the above-referenced example applications.

Returning to FIG. 1, the input image 110 is an image to be received and includes the object. The input image 110 is a two-dimensional (2D) image, for example, a color image and a grayscale image. The input image 110 includes a plurality of pixels, and each pixel has a pixel value. In a case of the input image 110 being a color image, a pixel value indicates a color value, for example, a red, green, and blue (RGB) value and other color spaces. In a case of the input image 110 being a grayscale image, a pixel value indicates a brightness value or an intensity value. However, the input image 110 may not be limited to the details described in the foregoing, and the input image 110 may be a three-dimensional (3D) image. In such a case, each pixel may further include a depth value.

The object image is an image corresponding to the object of the input image 110. For example, the object image may be an image in which a background portion is excluded from the input image 110. The object image may be a foreground image 120 including only a foreground of the input image 110 or a mask image 130 including only a mask. The foreground image 120 is an image in which each pixel of a portion corresponding to the foreground has a corresponding pixel value, and the mask image 130 is an image in which a pixel of the portion corresponding to the foreground and a pixel corresponding to a portion that does not correspond to the foreground are classified as different values. For example, the different values may be binary values. For example, a pixel value of the pixel of the portion corresponding to the foreground may be 1, and a pixel value of the pixel of a portion corresponding to a background may be 0.

Thus, according to at least some example embodiments, in the foreground image 120, pixel values of the pixels of the portion corresponding to the foreground may be maintained to be equal to pixel values of the pixels of the portion corresponding to the foreground the input image 110. Further, according to at least some example embodiments, in the mask image 130, pixel values of the pixels of the portion corresponding to the foreground and pixel values of the pixels of the portion corresponding to the background may be binarized.

Hereinafter, extracting the object image from the input image 110 will be described in detail.

Figure 2:
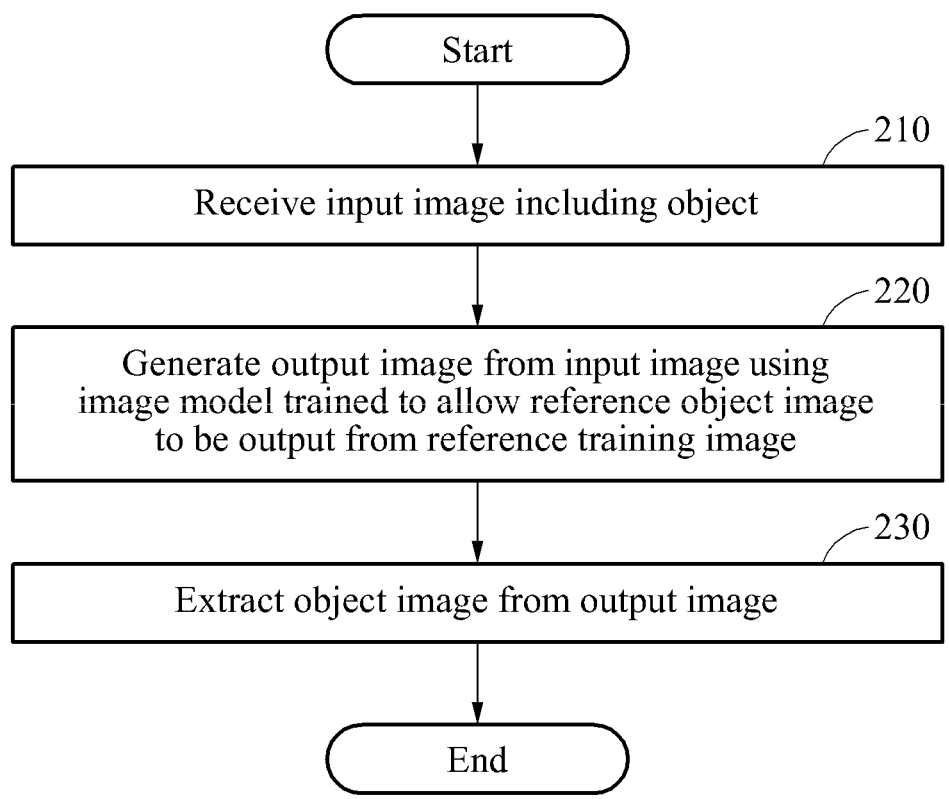
FIG. 2 is a flowchart illustrating an example of a method of segmenting an object from an image according to at least one example embodiment.

FIG. 2 is a flowchart illustrating an example of a method of segmenting an object from an image according to at least one example embodiment.

Referring to FIG. 2, in operation 210, a processor of an object segmenting apparatus receives an input image including an object. For example, the processor may receive the input image from an external source in a wired or wireless manner, or obtain the input image through a camera included in the object segmenting apparatus.

In operation 220, the processor of the object segmenting apparatus generates an output image corresponding to the object from the input image using an image model trained output an output image indicating a reference object image based on receiving, as input to the image model, a reference training image corresponding to the reference object image. A pixel value $p_i$ of each pixel of the output image may indicate a probability of a corresponding pixel in the input image being included in the object. For example, in a case of the output image being used to identify a mask portion of a mask image, a minimum pixel value and a maximum pixel value of the output image may be 0 and 1, respectively. According to at least one example embodiment, as the pixel value of a pixel of the output image approaches 1, the probability that a pixel of the input image corresponding to the pixel of the output image is included in the object increases, and thus, the probability that the pixel of the input image corresponding to the pixel of the output image corresponds to the mask portion of the mask image also increases.

The image model refers to a model trained to generate a desired output based on an input, and indicates a parameter in a machine learning structure. The machine learning structure may be expressed as a function that can generate, as output data, predictions, decisions and/or classifications regarding one or more parameters of input data input to the function based on a training process. The training process may be accomplished using, for example, multiple sets of reference input data and corresponding reference output data. According to at least one example embodiment, the image model may be configured to output, based on the input image, an output image that indicates the object included in the input image. According to at least one example embodiment, the image model may be configured to output, based on the input image, an output image based upon which the portion of the input image corresponding to the object may be identified. For example, the image model may include connection weights as parameters of a neural network, and be trained to allow a reference object image to be output based on a corresponding reference training (i.e., input) image. The training of the image model will be described in detail with reference to FIGS. 12 and 13.

In operation 230, the processor of the object segmenting apparatus extracts an object image from the output image. For example, the processor may perform labeling by classifying pixels of the output image into one of classes including a class of pixels corresponding to a foreground and a class of pixels not corresponding to the foreground. The extracting of the object image through the classifying of the pixels will be described in detail with reference to FIGS. 6 through 10.

Figure 3:
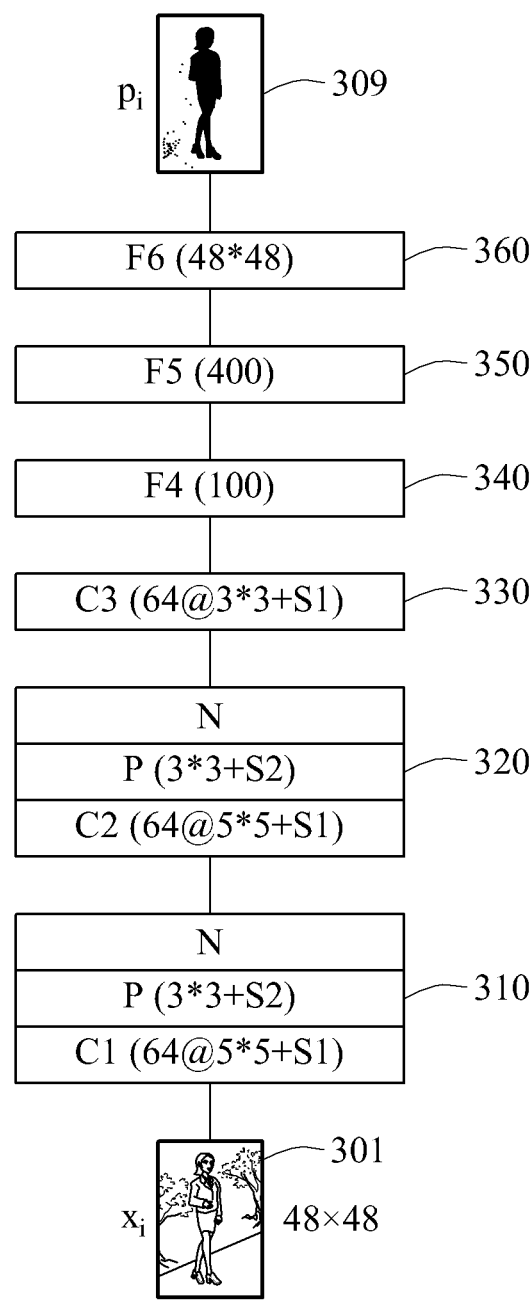
FIGS. 3 through 5 are diagrams illustrating examples of a process of generating an output image from an input image using an image model according to at least one example embodiment.
Figure 4:
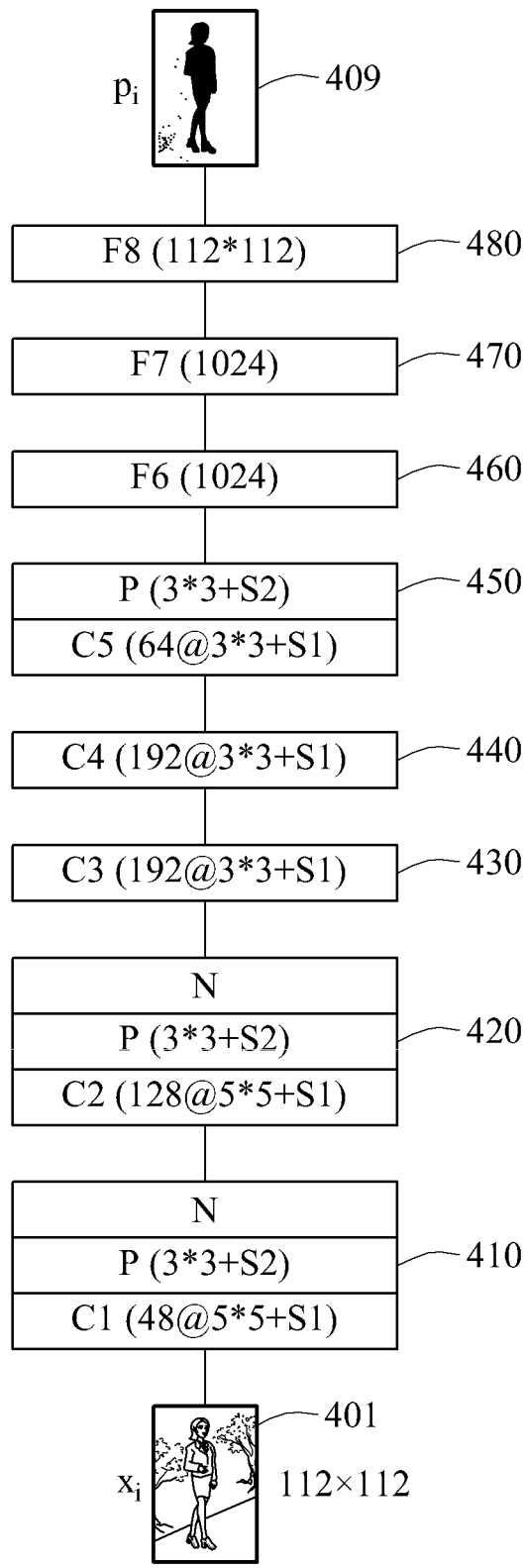
Figure 5:
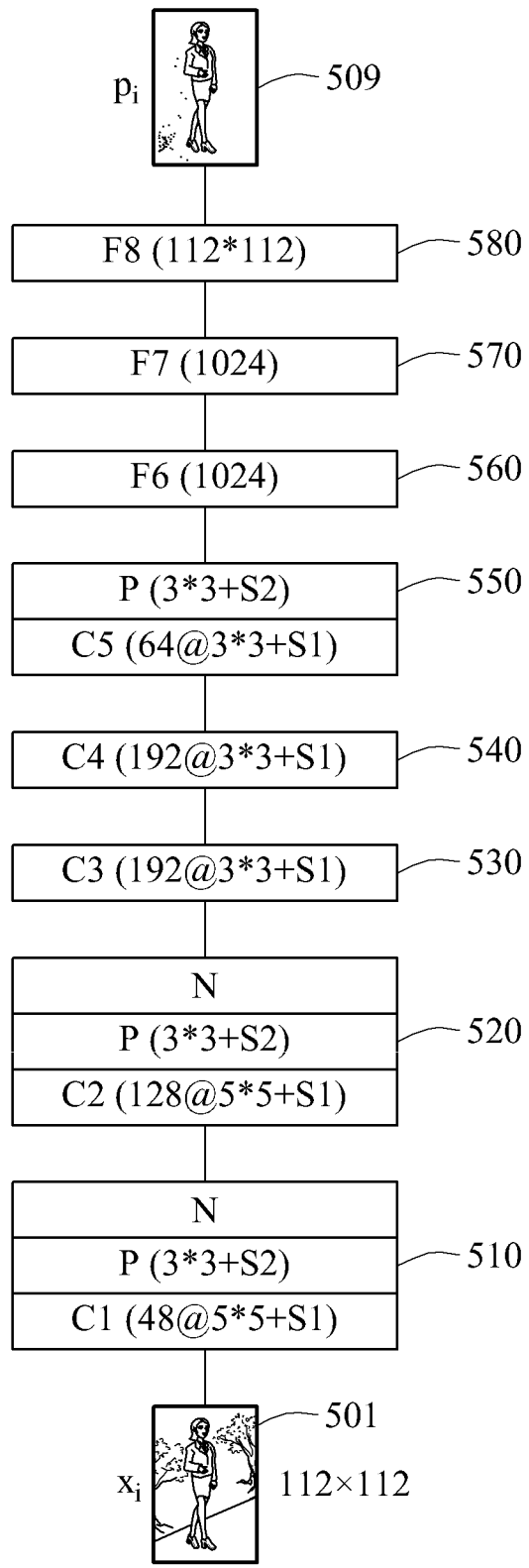

FIGS. 3 through 5 are diagrams illustrating examples of a process of generating an output image from an input image using an image model according to at least one example embodiment.

As the examples illustrated in FIGS. 3 through 5, cases in which an image model includes a connection weight as a parameter of a neural network are described. The neural network corresponding to the image model illustrated in FIGS. 3 through 5 completes training, and may be configured to output an output image in which an i-th pixel has a pixel value of $p_i$ with respect to an input image in which an i-th pixel has a pixel value of $x_i$. An i-th pixel of the input image may correspond to an i-th image of the output pixel. Here, "i" is an index having a value that is an integer greater than or equal to 1.

The neural network used herein uses artificial neurons having a simplified function of a biological neuron, and the artificial neurons may be connected through a connection line having a connection weight. The connection weight, which is the parameter of the neural network, is a value possessed by the connection line and indicates a connection intensity. The neural network may perform a recognition function or training process that is at least somewhat similar to that of a human through the artificial neurons. An artificial neuron is also referred to as a node.

The neural network includes a plurality of layers. For example, the neural network may include an input layer, a hidden layer, and an output layer. The input layer may receive an input for performing training and transfer the input to the hidden layer. The output layer may generate an output of the neural network based on a signal received from nodes in the hidden layer. The hidden layer may be disposed between the input layer and the output layer and change training data transferred through the input layer to a predictable value. Nodes included in the input layer and the hidden layer may be connected through a connection line having a connection weight, and nodes included in the hidden layer and the output layer may be connected through a connection line having a connection weight. The input layer, the hidden layer, and the output layer may include a plurality of nodes.

The neural network may include a plurality of hidden layers. A neural network including the plurality of hidden layers may be referred to, for example, as a deep neural network, and training the deep neural network is referred to as deep learning. A node included in the hidden layer is referred to as a hidden node. An output of a hidden node in a previous time section may be connected to hidden nodes in a current time section. An output of a hidden node in the current time section may be connected to hidden nodes in a subsequent time section. A neural network having a recurrent connection between hidden nodes in different time sections may be referred to as, for example, a recurrent neural network.

For example, the hidden layer may include a convolution layer, a pooling layer, a normalization layer, and a fully connected layer. The convolution layer may be used to perform convolution filtering used to filter out information extracted from a previous layer using a filter of a preset size, and is illustrated as "C" in FIGS. 3 through 5. The pooling layer may be used to extract a representative value from information of a previous layer through pooling. For example, the pooling layer may be a layer from which a processor may extract a maximum value in a window of a size preset for the information of the previous layer by sliding a predetermined number of spaces. Information of the previous layer may be, for example, pixel values of an image. The pooling layer may be illustrated as "P" in FIGS. 3 through 5. The normalization layer refers to a layer in which a pixel value of a pixel of an image is normalized, and is illustrated as "N" in FIGS. 3 through 5. The fully connected layer may be connected to all nodes of a previous layer, and is illustrated as "F" in FIGS. 3 through 5.

Referring to FIG. 3, a neural network includes an input layer (not illustrated), an output layer (not illustrated), and six hidden layers (i.e., first through sixth layers 310~360). The input layer receives an input image 301. In a first layer 310, "C1(64@5*5+S1)" indicates that a convolution layer has, for example, 64 filters, a size of each filter is 5*5, and a filter moves by one space. Also, in the first layer 310, "P(3*3+S2)" indicates that a pooling layer moves by two spaces with a size of a window being 3*3, and "N" indicates a normalization layer. A second layer 320 includes a convolution layer having 64 filters of a 5*5 size moving by one space, a pooling layer having a window of a 3*3 size moving by two spaces, and a normalization layer. A third layer 330 includes a convolution layer having 64 filters of a 3*3 size moving by one space. A fourth layer 340 includes a fully connected layer having 100 nodes and a fifth layer 350 includes a fully connected layer having 400 nodes. A sixth layer 360 includes a fully connected layer having 48*48 nodes. Here, the sixth layer 360 immediately prior to the output layer may be configured to output, to the output layer, an image having a resolution equal to a resolution (i.e., 48×48 in the example shown in FIG. 3) of the input image 301 of the input layer. The neural network illustrated in FIG. 3 may be trained to output, based on the input image 301, an output image 309 corresponding to a mask.

Referring to FIG. 4, a neural network includes an input layer (unillustrated), an output layer (unillustrated), and eight hidden layers (i.e., first through eighth layers 410~480). The first layer 410 includes a convolution layer having 48 filters of a 5*5 size moving by one space, a pooling layer having a window of a 3*3 size moving by two spaces, and a normalization layer. The second layer 420 includes a convolution layer having 128 filters of a 5*5 size moving by one space, a pooling layer having a window of a 3*3 size moving by two spaces, and a normalization layer. Each of the third layer 430 and the fourth layer 440 includes a convolution layer having 192 filters of a 3*3 size moving by one space. The fifth layer 450 includes a convolution layer having 64 filters of a 3*3 size moving by one space and a pooling layer having a window of a 3*3 size moving by two spaces. Each of the sixth layer 460 and the seventh layer 470 includes a fully connected layer having 1024 nodes. The eighth layer 480 includes a fully connected layer having 112*112 nodes. In the eighth layer 480, the nodes may be configured to allow a resolution of an input image 401, and a resolution of an output image 409 to be equal to each other.

For example, the resolutions of the input image 401 and the output image 409 are both 112×112 in the example illustrated in FIG. 4.

Referring to FIG. 5, a neural network includes layers, for example, a first layer 510, a second layer 520, a third layer 530, a fourth layer 540, a fifth layer 550, a sixth layer 560, a seventh layer 570, and an eighth layer 580, in the same structure as in the layers illustrated in FIG. 4. The neural network illustrated in FIG. 5 may be trained to output, based on an input image 501, an output image 509 corresponding to a foreground. Depending on the training data used in a neural network training process, neural networks like those illustrated in FIGS. 3-5 may be trained to output different output images based on the same input image.

Figure 6:
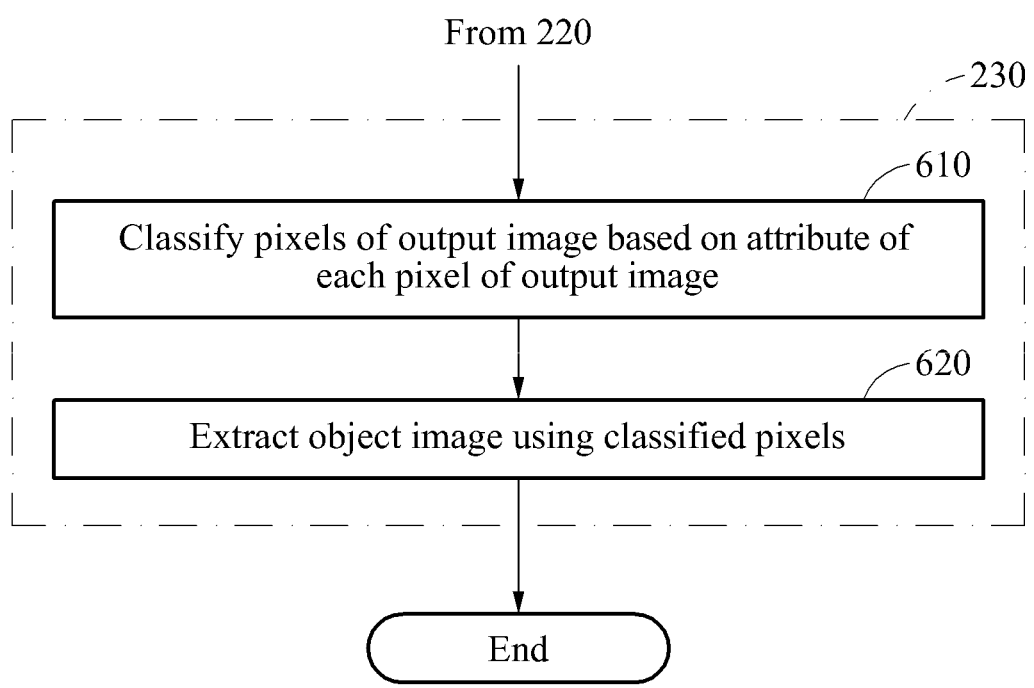
FIG. 6 is a flowchart illustrating a method of extracting an object image from an output image according to at least one example embodiment.

FIG. 6 is a flowchart illustrating a method of extracting an object image from an output image according to at least one example embodiment.

FIG. 6 is a flowchart illustrating, in detail, operation 230 described with reference to FIG. 2.

Referring to FIG. 6, in operation 610, a processor of an object segmenting apparatus classifies pixels of an output image based on an attribute of each pixel of the output image. An attribute of a pixel of the output image may indicate whether the pixel corresponds to an object, a portion of the object, a foreground, or a background in the output image. For example, an attribute of a pixel of the output image may indicate whether the pixel is a foreground or a background in the output image. The classifying of the pixels will be described in detail with reference to FIG. 7.

In operation 620, the processor of the object segmenting apparatus extracts an object image using the classified pixels. For example, the processor may generate the object image by collecting pixels classified into the object. The extracting of the object image using a pixel will be described in detail with reference to FIGS. 8 through 10.

Figure 7:
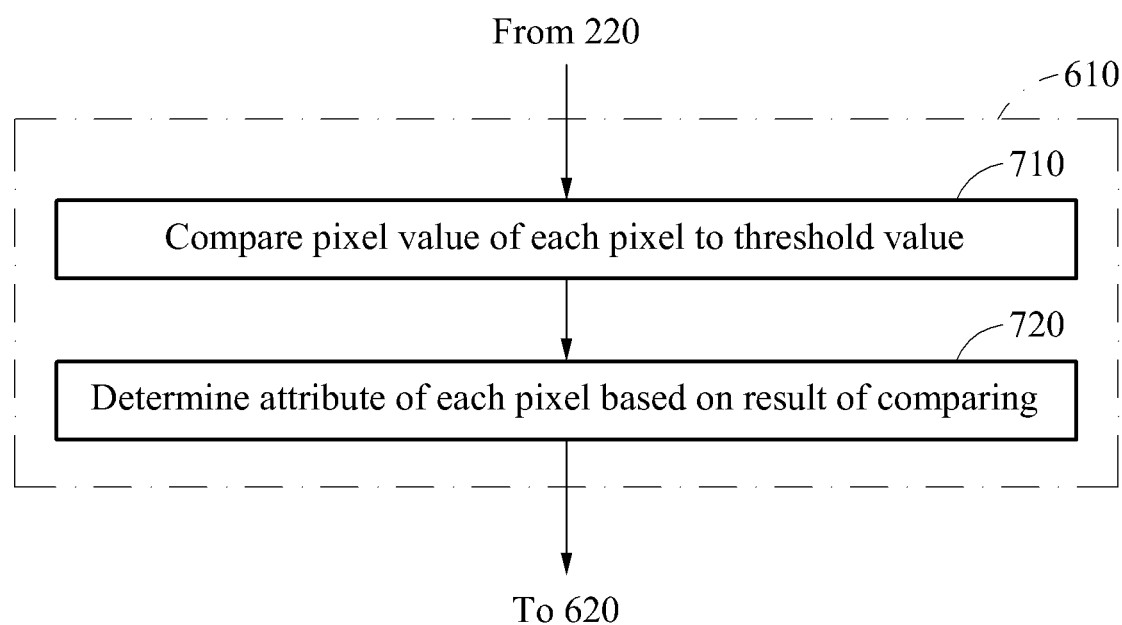
FIG. 7 is a flowchart illustrating a method of classifying pixels of an output image based on an attribute of each pixel of the output image according to at least one example embodiment.

FIG. 7 is a flowchart illustrating a method of classifying pixels of an output image based on an attribute of each pixel of the output image according to at least one example embodiment.

FIG. 7 is a flowchart illustrating, in detail, operation 610 described with reference to FIG. 6.

Referring to FIG. 7, in operation 710, a processor of an object segmenting apparatus compares a pixel value of each pixel of an output image to a threshold value. For example, the processor may determine whether a pixel value of each pixel of an output image generated in operation 220 described with reference to FIG. 2 is greater than the threshold value. For example, in a case of segmenting a mask image from an input image, a pixel value of a pixel corresponding to a background in the mask image may be, for example, 0 and a pixel value of a pixel corresponding to a mask may be, for example, 1, and thus the threshold value may be set to be 0.5. For another example, in a case of segmenting a foreground image from an input image, a pixel value of a pixel corresponding to a background in the foreground image may be, for example, 0 and a maximum value of a pixel may be, for example, 255, and thus the threshold value may be set to be, for example, 127. A minimum and a maximum value of a pixel, and a threshold value may not be limited to the foregoing values, and thus modifications may be made based on a design.

In operation 720, the processor of the object segmenting apparatus determines an attribute of each pixel based on a result of the comparing of operation 710. The processor of the object segmenting apparatus may determine that a pixel having a pixel value greater than the threshold value has a foreground attribute or a mask attribute. The processor may determine that a pixel having a pixel value less than or equal to the threshold value has a background attribute. However, the determining of the attribute may not be limited to the foregoing, and thus the processor of the object segmenting apparatus may determine, based on a design, that a pixel having a pixel value greater than the threshold value has the background attribute when a value corresponding to the background attribute is greater than a value corresponding to the foreground attribute.

For example, in the segmenting of the mask image, when a pixel value of a pixel of the output image generated in operation 220 is closer to 1, the pixel may have a high possibility of corresponding to a mask portion of a mask image. When a pixel value of a pixel of the output image generated in operation 220 is closer to 0 than to 1, the pixel may have a high probability of corresponding to a background. Thus, in the segmenting of the mask image, the processor of the object segmenting apparatus may determine an attribute of a pixel having a pixel value greater than a threshold value of 0.5 to be the mask attribute, and an attribute of a pixel having a pixel value less than or equal to the threshold value of 0.5 to be the background attribute. For another example, in the segmenting of the foreground image, when a pixel value of a pixel is closer to 0, the pixel may have a high possibility of corresponding to the background. When a pixel value of a pixel is closer to 255, the pixel may have a high probability of corresponding to a foreground. Thus, the processor may determine whether an attribute of each pixel corresponds to the foreground or the background based on a threshold value of 127. However, the determining of an attribute of each pixel may not be limited to the foregoing, and thus the processor of the object segmenting apparatus may determine whether an attribute of each pixel corresponds to an object or a portion of the object.

Figure 8:
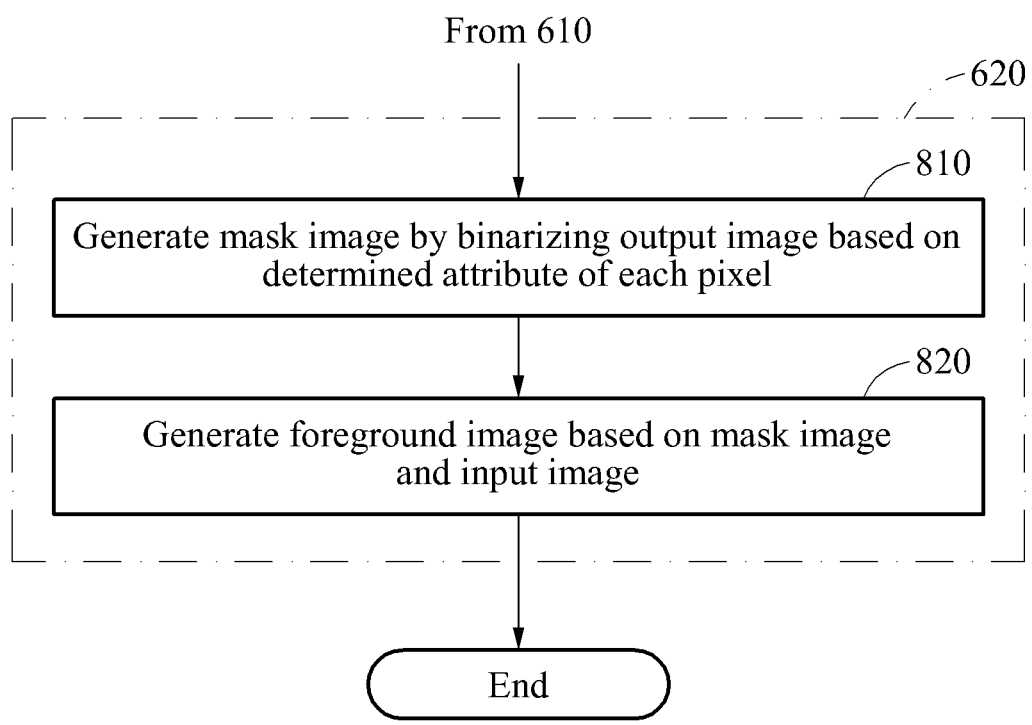
FIGS. 8 and 9 are flowcharts illustrating examples of a method of extracting an object image using classified pixels according to at least one example embodiment.
Figure 9:
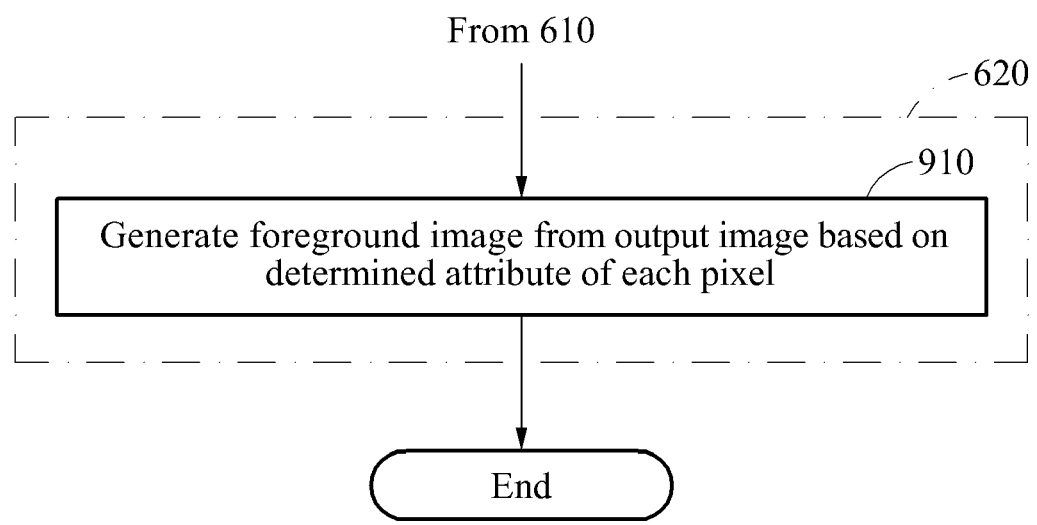

FIGS. 8 and 9 are flowcharts illustrating examples of a method of extracting an object image using classified pixels according to at least one example embodiment.

FIG. 8 is a flowchart illustrating, in detail, an example of a method of performing operation 620 described with reference to FIG. 6. An image model stored in a memory of an object segmenting apparatus, which performs the method to be described with reference to FIG. 8, is a model trained to output a reference mask image from a reference training image. The reference mask image is a mask image set to be output from the reference training image.

Referring to FIG. 8, in operation 810, a processor generates a mask image by binarizing (i.e., representing in binary form) an output image based on a determined attribute of each pixel. For example, the processor of the object segmenting apparatus may set, to be 1, a pixel value of a pixel determined to correspond to a mask attribute in operation 610 described with reference to FIG. 6 and set, to be 0, a pixel value of a pixel determined to correspond to a background attribute in operation 610, and generate a mask image in which each pixel has a binary value. However, the setting of a pixel value may not be limited to the foregoing, and thus the processor may set a pixel value corresponding to a background to be 1 and a pixel value corresponding to a mask to be 0. Also, a binary value may not be limited to 0 and 1, and thus two different real numbers may be used. Hereinafter, 1 is used for the mask attribute and 0 is used for the background attribute.

In operation 820, the processor of the object segmenting apparatus generates a foreground image based on the mask image generated in operation 810 and an input image. For example, the processor of the object segmenting apparatus may generate the foreground image by multiplying a pixel value of a pixel of the mask image and a pixel value of a corresponding pixel in the input image. Since the mask image has a pixel value of 1 for the mask, a portion that is not the mask may be eliminated from the input image and only a pixel value of the mask may be maintained when multiplying a pixel value of each pixel of the mask image and a pixel value of a corresponding pixel in the input image.

According to at least one example embodiment, in a case of segmenting the mask image from the input image, the processor of the object segmenting apparatus may not perform operation 820. Operation 820 may be performed in a case of segmenting the foreground image from the input image.

FIG. 9 is a flowchart illustrating, in detail, another example of a method of performing operation 620 described with reference to FIG. 6. An image model stored in a memory of an object segmenting apparatus, which performs the method to be described with reference to FIG. 9, is a model trained to output a reference foreground image from a reference training image. The reference foreground image indicates a foreground image set to be output from the reference training image.

Referring to FIG. 9, in operation 910, a processor of an object segmenting apparatus generates a foreground image from an output image based on a determined attribute of each pixel. For example, the processor of the object segmenting apparatus may generate the foreground image by maintaining a pixel value of a pixel of a portion corresponding to a foreground in the output image and initializing a pixel value of a pixel of a portion not corresponding to the foreground in the output image (i.e., changing the pixel value of the portion not corresponding to the foreground to 0).

Figure 10:
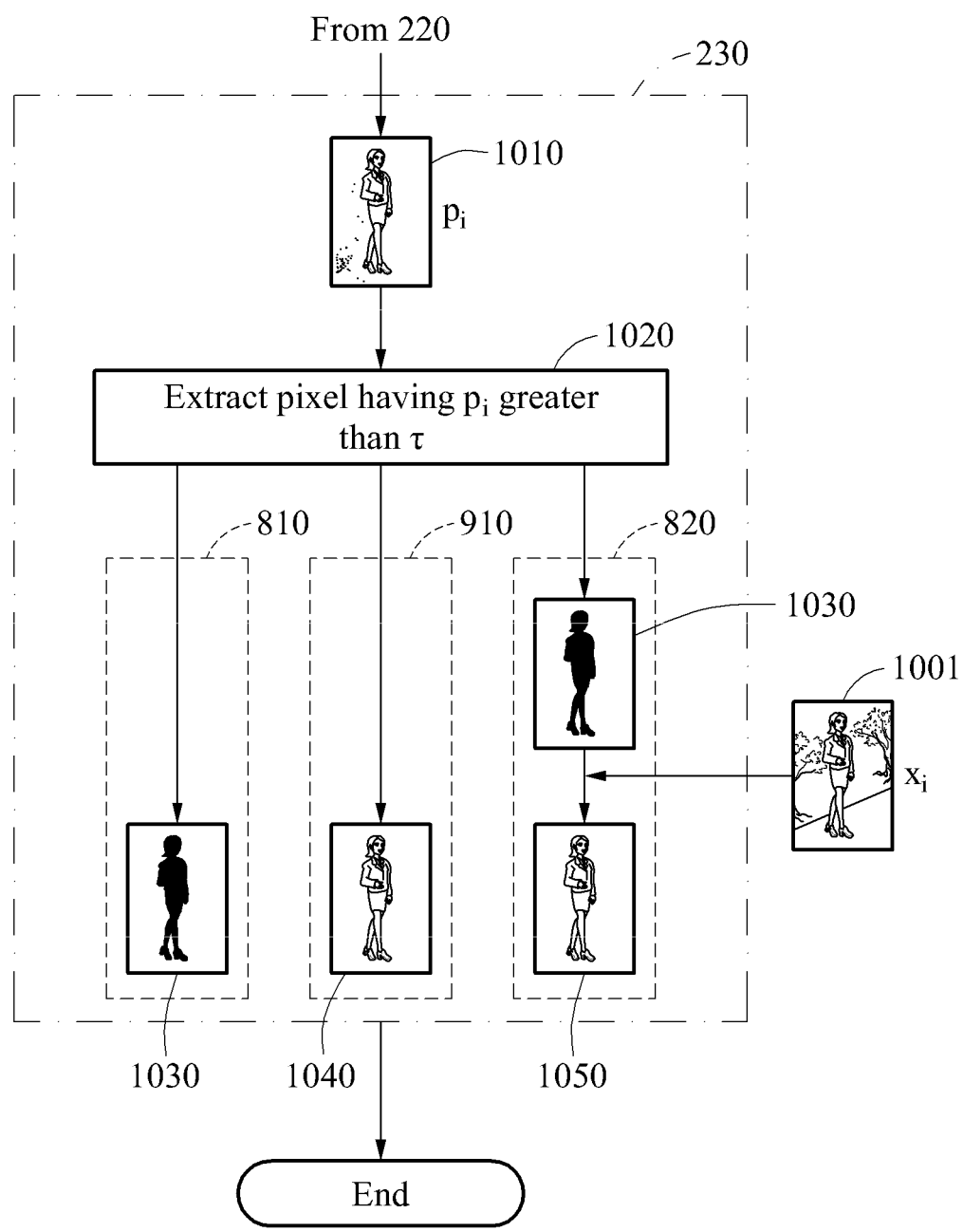
FIG. 10 is a diagram illustrating a flow of a method of extracting an object image using a pixel of an output image according to at least one example embodiment.

FIG. 10 is a diagram illustrating a flow of a method of extracting an object image using a pixel of an output image according to at least one example embodiment.

For convenience of description, FIG. 10 illustrates an overall flow of operation 810 of generating a mask image in operation 230 described with reference to FIG. 2 and operations 910 and 820 of generating a foreground image. In the flow illustrated in FIG. 10, one of operation 810, operation 910, and operation 820 may be performed according to at least one example embodiment, but may not be limited thereto. The operations 810, 910, and 820 may be selectively performed based on a design.

Referring to FIG. 10, a processor generates an output image 1010 in operation 220 described with reference to FIG. 2. An i-th pixel of the output image 1010 may have a pixel value $p_i$.

In operation 1020, the processor extracts a pixel having $p_i$ greater than a threshold value T. Here, for a description of the threshold value τ, reference may be made to details described with reference to FIG. 7. The processor may designate the i-th pixel as having a foreground attribute or a mask attribute if the pixel value $p_i$ is greater than τ.

In operation 810, as described with reference to FIG. 8, the processor of the object segmenting apparatus generates a mask image 1030 by collecting pixels determined to have the mask attribute.

In operation 910, as described with reference to FIG. 9, the processor of the object segmenting apparatus generates a foreground image 1040 by collecting pixels determined to have the foreground attribute.

In operation 820, as described with reference to FIG. 8, the processor of the object segmenting apparatus generates the mask image 1030 by collecting the pixels determined to have the mask attribute, and generates a foreground image 1050 using the mask image 1030 and an input image 1001.

Figure 11:
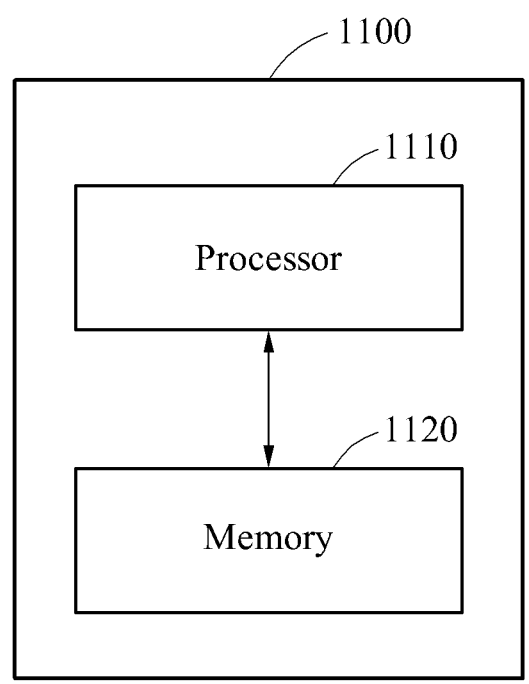
FIG. 11 is a diagram illustrating a configuration of an apparatus for segmenting an object from an image according to at least one example embodiment.

FIG. 11 is a diagram illustrating a configuration of an object segmenting apparatus 1100 according to at least one example embodiment.

Referring to FIG. 11, the object segmenting apparatus 1100 includes a processor 1110 and a memory 1120.

The processor 1110 may receive an input image including an object, generate an output image from the input image using an image model, and extract an object image from the output image. Detailed operations of the processor 1110 are described with reference to FIGS. 1 through 10, and thus a more detailed and repeated description will be omitted here for brevity.

The memory 1120 may store the image model trained to output a reference object image from a reference training image. In addition, the memory 1120 may store, temporally or permanently, an input, an intermediate result, and a final result in image processing, for example, the input image, the output image, and the object image.

The term 'processor', as used in the present disclosure, may refer to, for example, a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multi-processor, an application-specific integrated circuit (ASIC), and a field programmable gate array (FPGA). Processors executing program code are programmed processors, and thus, are special-purpose computers.

For example, according to at least some example embodiments, the processor 1110 may execute computer-readable code (e.g., software) that is stored in memory (e.g., the memory 1120) and includes instructions for causing the processor 1110 to carry out and/or control some or all of the operations described herein as being performed by an object segmenting apparatus (or an element thereof).

The object segmenting apparatus 1100 may further include a camera (not shown). The camera may capture images of areas outside of the object segmenting apparatus 1100 to obtain the input image. The object segmenting apparatus 1100 may further include a communicator (not shown). The communicator may receive the input image from an external source in a wired or wireless manner.

The object segmenting apparatus 1100 may perform a determination based on an image unit, in lieu of a pixel unit, to segment an object from an image using the image model, for example, a neural network. For example, the object segmenting apparatus 1100 may segment an object from an image by determining an attribute of each pixel for an entire input image, rather than determining whether a patch corresponding to a pixel is a foreground or a background. Thus, an amount of time for the segmenting may be reduced to increase a speed and accuracy may be improved. The object segmenting apparatus 1100 may be provided as a mobile device such as a smartphone or as a stationary apparatus such as a personal computer (PC), or provided in a form of a chip to be included, for example, in a mobile phone or a television (TV).

Figure 12:
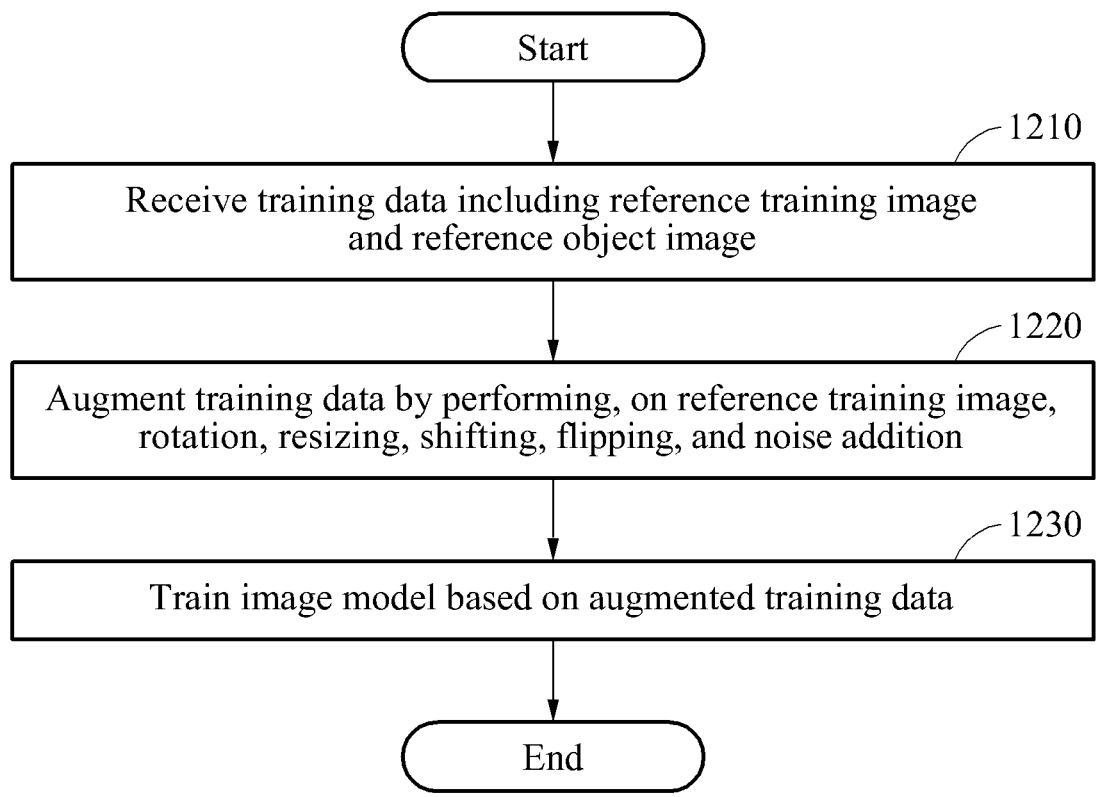
FIG. 12 is a flowchart illustrating an example of a method of training an image model used to segment an object from an image according to at least one example embodiment.

FIG. 12 is a flowchart illustrating an example of a method of training an image model used to segment an object from an image according to at least one example embodiment.

Referring to FIG. 12, in operation 1210, a model trainer of an apparatus for training an image model, hereinafter simply referred to as an image model training apparatus, receives training data including a reference training image and a reference object image. The reference training image is an image used as an input for training, and the reference object image the desired output image corresponding the reference training image (i.e., the desired output of the trained image model in response to receiving the reference training image as input to the trained image model). The training data may include a training pair of a reference training image and a reference object image corresponding to the reference training image.

In operation 1220, the model trainer augments the training data by performing, on the reference training image, at least one of rotation, resizing, shifting, flipping, and noise addition. For one pair of a reference training image and a reference object image, the model trainer may augment the reference training image to be mapped to the reference object image through a process which may include, for example, any or all of rotating, resizing, adding noise to, shifting, and flipping the reference training image.

The rotating indicates an image processing method to rotate a reference training image at an angle. For example, the model trainer may rotate the reference training image at an angle selected in a range of ±8°. The resizing indicates an image processing method to increase or decrease a size of a reference training image. For example, the model trainer may adjust the size of the reference training image at a rate selected between 0.9 times and 1.1 times. The shifting indicates an image processing method to crop a reference training image. For example, the model trainer may crop a portion of the reference training image at a location from the reference training image. The flipping indicates an image processing method to flip a reference training image upside down or from side to side. For example, the model trainer may flip a shifted reference training image with a 50% probability. The noise addition indicates an image processing method to add Gaussian noise to a reference training image. For example, the model trainer may add Gaussian noise having a mean value of 0 and a deviation of 0.9 for each pixel of the reference training image.

In operation 1230, the model trainer trains the image model based on the augmented training data. An operation of training the image model by the model trainer will be described in detail with reference to FIG. 13.

Figure 13:
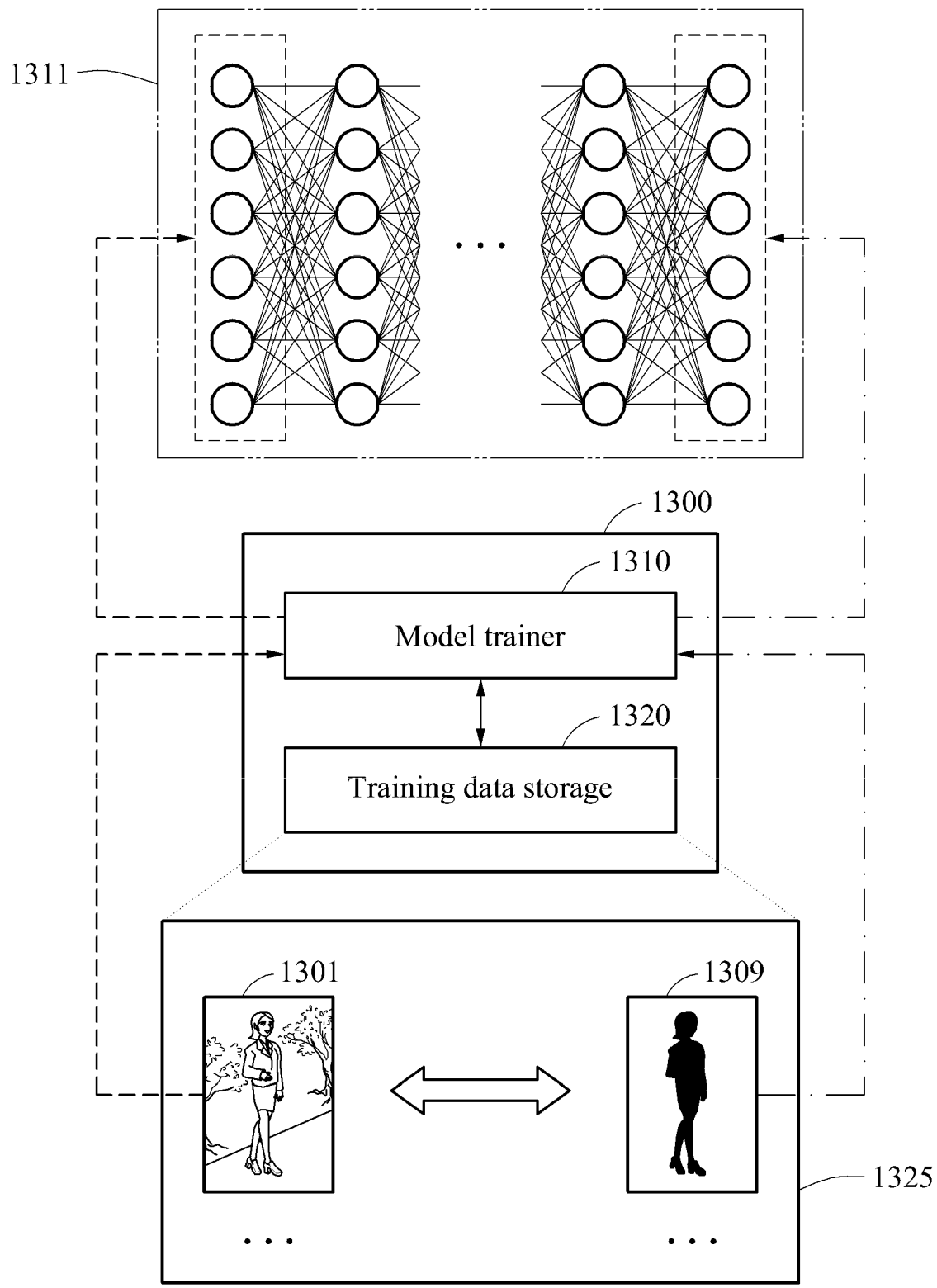
FIG. 13 is a diagram illustrating a configuration of an apparatus for training an image model used to segment an object from an image according to at least one example embodiment.

FIG. 13 is a diagram illustrating a configuration of an image model training apparatus 1300 used to segment an object from an image according to at least one example embodiment.

Referring to FIG. 13, the image model training apparatus 1300 includes a model trainer 1310 and a training data storage 1320. The model trainer 1310 may include at least one processor, and train an image model. The processor of the model trainer 1310 may execute computer-readable code (e.g., software) that is stored in memory (e.g., the memory included in the model training apparatus 1300) and includes instructions for causing the processor of the model trainer 1310 to carry out and/or control some or all of the operations described herein as being performed by an image model training apparatus, a model trainer (or an element thereof). For example, the model trainer 1310 may receive a reference training image 1301 and a reference object image 1309 from the training data storage 1320. The received reference training image 1301 and the reference object image 1309 may be included in the same training pair. The training data storage 1320 may include at least one memory, and store training data 1325 to be used to train the image model. The training data 1325 may include at least one training pair including a reference training image (e.g., the reference training image 1301) and a reference object image (e.g., the reference object image 1309), which are mapped to one another. A detailed process of training will be described hereinafter, and a case in which the image model includes a parameter of a neural network will be described as an example.

According to at least one example embodiment, the image model training apparatus 1300 may perform a method of training segmentation of an object from an image. For example, the image model training apparatus 1300 may train a parameter of an image model, for example, a neural network 1311, to allow a processor, for example, a processor 1110 illustrated in FIG. 14, to segment the reference object image 1309 from the reference training image 1301 using an image model. The image model used by the processor (e.g., the processor 1110) may be configured to generate an output image, for example, an output image 1405 illustrated in FIG. 14, corresponding to an object from an input image including the object, for example, an input image 1401 illustrated in FIG. 14. For example, the image model training apparatus 1300 may train the neural network 1311 through supervised learning. The supervised learning refers to a method of inputting the reference training image 1301 and the reference object image 1309 corresponding to the reference training image 1301 to the neural network 1311, and updating a connection weight of a connection line to output the reference object image 1309 corresponding to the reference training image 1301. For example, the image model training apparatus 1300 may update a connection weight between artificial neurons through a delta rule, error backpropagation learning, and the like.

The error backpropagation learning refers to a method of estimating an error through a forward computation on the reference training image 1301, propagating the estimated error by moving backward to a hidden layer and an input layer from an output layer, and updating a connection weight to reduce the error. A process of the neural network 1311 may be performed in a direction from an input layer to a hidden layer and then to an output layer. In the error backpropagation learning, the updating of the connection weight may be performed in a direction of the output layer to the hidden layer and then to the input layer. For example, a stochastic gradient descent method may be used as the error backpropagation learning. An initial connection weight in each layer may be determined based on a Gaussian distribution in which a mean value is 0 and a standard deviation is 0.01. In addition, a bias of convolution layers and fully connected layers may be initialized to be 0. A learning rate may decrease to 0.0001, after staring from 0.001.

The image model training apparatus 1300 may define an objective function to measure how close currently set connection weights are to a desired or, alternatively, optimal value, continuously change the connection weights based on a result of the objective function, and repetitively perform training. For example, the objective function may be an error function for the neural network 1311 to calculate an error between a value actually output based on the reference training image 1301 and a value expected to be output. The image model training apparatus 1300 may update the connection weights to reduce a value of the error function. The error function may be a squared L2 norm, and an error $L_i$ of an i-th pixel of an output image may be represented as in Equation 1.

$$L_i = \sqrt{\|p_i - m_i\|_2} \qquad \text{[Equation 1]}$$

In Equation 1, "$m_i$" denotes a binary value of an i-th pixel of the reference object image 1309 mapping the reference training image 1301. "$p_i$" denotes a pixel value of an i-th pixel of an output image generated from the reference training image 1301, and may be represented as in Equation 2.

$$p_i = g(f(x_i))  \quad \text{[Equation 2]}$$

In Equation 2, "$f(x_i)$" denotes a value at which the reference training image 1301 is projected to a feature space through at least one convolution filtering, and "$g(\ )$" denotes a function to derive a final result of the neural network 1311 processed through a fully connected layer.

According to at least one example embodiment, the image model may be configured to allow a resolution of an object image or an output image generated by the image model to be equal to a resolution of the corresponding input image input to image model. In addition, the image model may include the neural network 1311, and an activation function of the neural network 1311 may include at least one non-linear function, for example, a sigmoid neuron function. Further, the image model may be trained based on an image obtained by performing, on the reference training image 1301, at least one of rotation, resizing, shifting, flipping, and noise addition.

Figure 14:
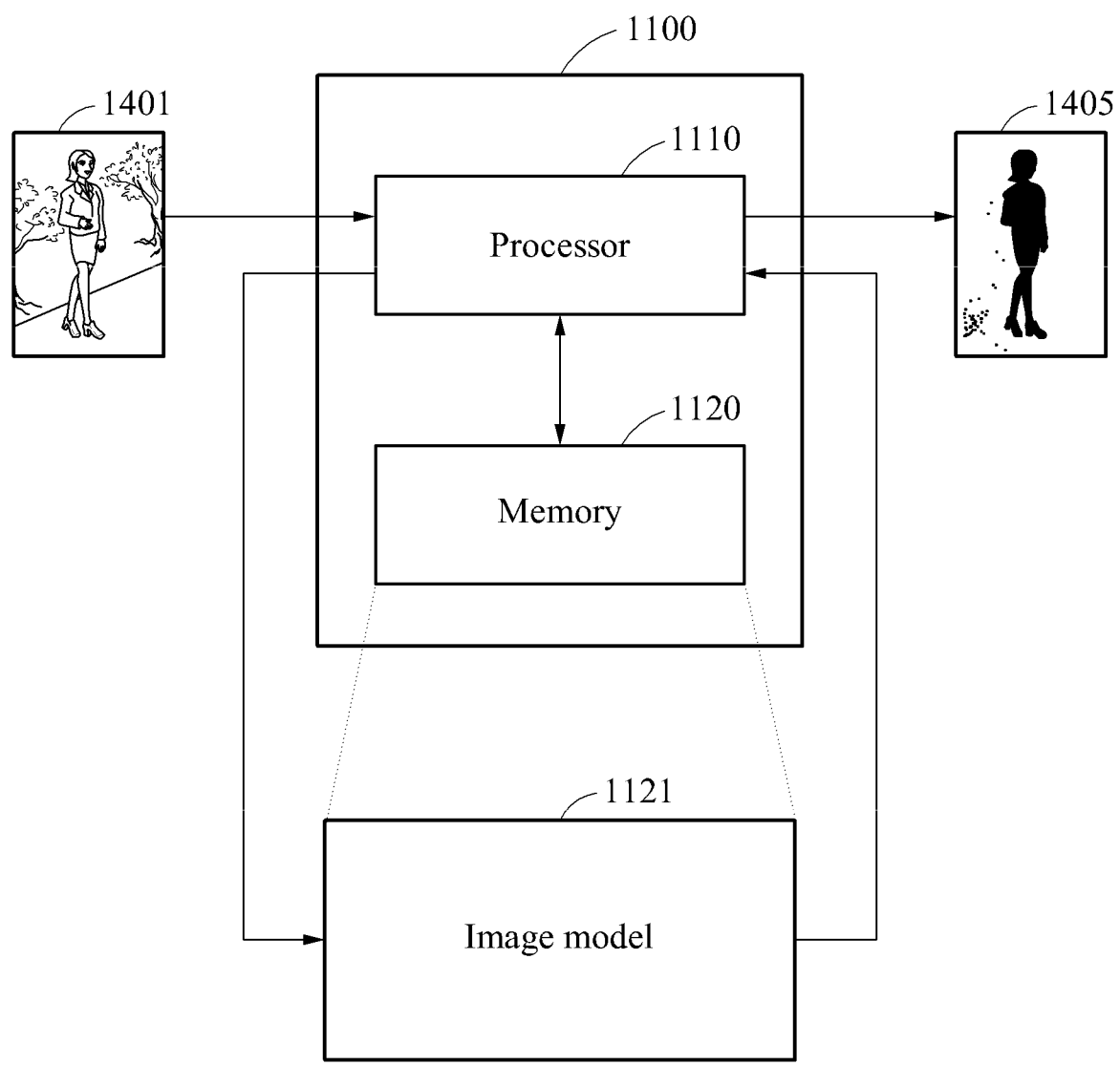
FIG. 14 is a diagram illustrating an example of an object image generated from an input image using the image model trained according to the process described with reference to FIG. 13.

FIG. 14 is a diagram illustrating an example of an object image generated from an input image using the image model trained according to the process described with reference to FIG. 13.

Referring to FIG. 14, in the illustrated in FIG. 14, the image model 1121 (which may be stored in the memory 1120 of the object segmenting apparatus 1100) is an image model that has been trained through the process described with reference to FIG. 13.

The processor 1110 of the object segmenting apparatus 1100 may generate an output image 1405 based on an input image 1401 using the image model 1121. For example, a pixel value of each pixel of the output image 1405 may indicate a probability of a pixel corresponding to a mask portion of a mask image. For example, as illustrated in the output image 1405 in FIG. 14, a portion of the output image 1405 corresponding to a non-object portion of the input image 1401 may have a low probability of corresponding to a mask portion of a mask image. As described with reference to FIG. 10, a pixel with a low probability of corresponding to the mask portion of a mask image may be eliminated through a comparison to a threshold value.

Figure 15:
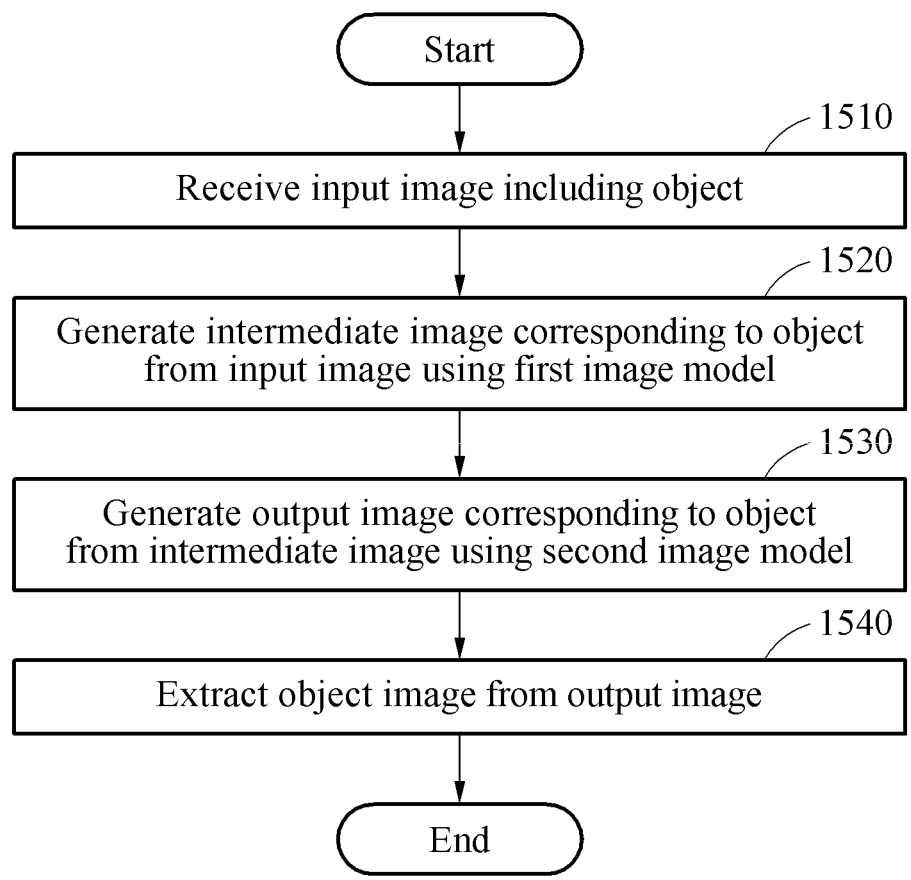
FIG. 15 is a flowchart illustrating another example of a method of segmenting an object from an image according to at least one example embodiment.

FIG. 15 is a flowchart illustrating another example of a method of segmenting an object from an image according to at least one example embodiment.

Referring to FIG. 15, in operation 1510, a processor of an object segmenting apparatus receives an input image including an object. The input image to be received may be the same as illustrated in FIG. 1.

In operation 1520, the processor generates an intermediate image corresponding to the object from the input image using a first image model. The first image model may be configured to be that same as, or, alternatively, similar to, the image model described with reference to FIG. 2, and may be used to perform an initial step for segmenting an object image from the input image. For example, the first image model may be trained to output a reference object image from a reference training image. The training of the first image model will be described in detail with reference to FIGS. 17 and 18. The intermediate image refers to an intermediate result generated based on the input image using the first image model by the processor.

In operation 1530, the processor generates an output image corresponding to the object from the intermediate image using a second image model. The second image model may be configured to be similar to the image model described with reference to FIG. 2, and may be used to perform an additional step for segmenting the object image from the intermediate image. For example, the second image model may be trained to output the reference object image from a reference intermediate image, which is a result obtained by applying the first image model to the reference training image. The training of the second image model will be described in detail with reference to FIGS. 17 and 18. with respect to FIG. 15, the output image refers to a final result generated by the processor based on the intermediate image using the second image model.

As described above with reference to FIG. 15, the processor of the object segmenting apparatus according to at least some example embodiments may first generate the intermediate image as a rough result from the input image using the first image model, and secondly generate the output image as a fine result based on the intermediate image using the second image model.

In operation 1540, the processor extracts the object image from the output image using, for example, the same methods of extracting an object image from an output image discussed above with reference to FIGS. 1 through 10.

For example, the object segmenting apparatus 1100 illustrated in FIG. 11 may perform the method described with reference to FIG. 15, and the memory 1120 illustrated in FIG. 11 may store the first image model and the second image model.

Figure 16:
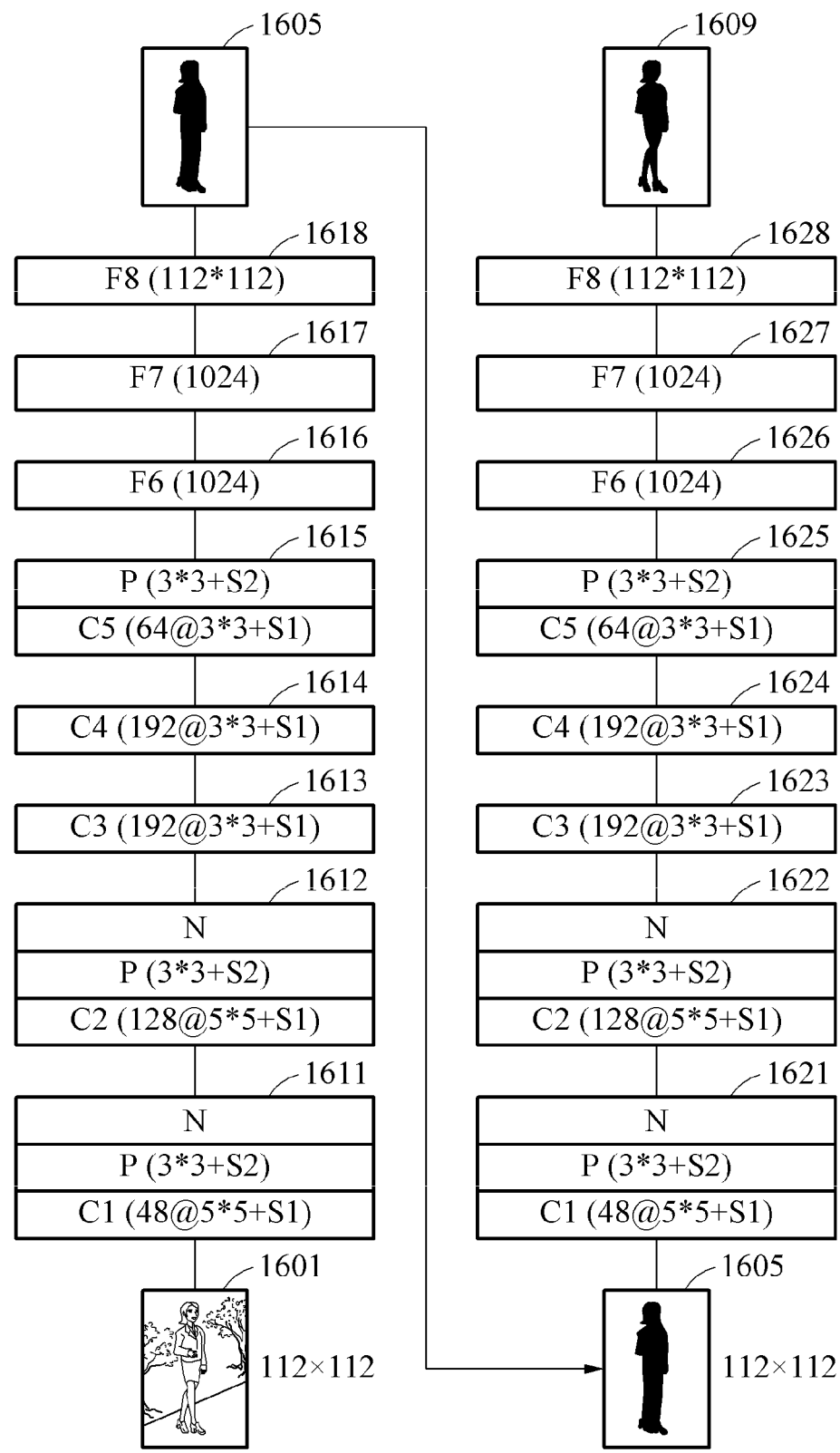
FIG. 16 is a diagram illustrating another example of a process of generating an output image from an input image using an image model according to at least one example embodiment.

FIG. 16 is a diagram illustrating another example of a process of generating an output image from an input image using an image model according to at least one example embodiment FIG. 16 illustrates an example of a first image model and a second image model including a connection weight as a parameter of a neural network. In FIG. 16, a first neural network corresponding to the first image model and a second neural network corresponding to the second image model may complete training.

Referring to FIG. 16, each of the first neural network and the second neural network includes an input layer (unillustrated), an output layer (unillustrated), and eight hidden layers. The input layer of the first neural network may receive an input image 1601. A first layer 1611 through an eighth layer 1618 of the first neural network may have the same structure illustrated in FIG. 4. Here, the first neural network may be trained to output an object image from the input image 1601.

The input layer of the second neural network may receive an intermediate image 1605. A first layer 1621 through an eighth layer 1628 of the second neural network may have the same structure illustrated in FIG. 4. Here, the second neural network may be trained to output the object image from the intermediate image 1605. The second neural network may output an output image 1609 corresponding to an object.

Although respective structures of the first image model and the second image model are illustrated to be the same in FIG. 16, the structures are not limited thereto, and the structures of the first image model and the second image model may be configured to be different from each other. In addition, although the first image model and the second image model are illustrated to be of the same neural network type in FIG. 16, the first image model and the second model may be configured to be of different types. Further, although the first image model and the second image model have different parameters based on a training result, the first image model and the second image model may have the same parameters.

Figure 17:
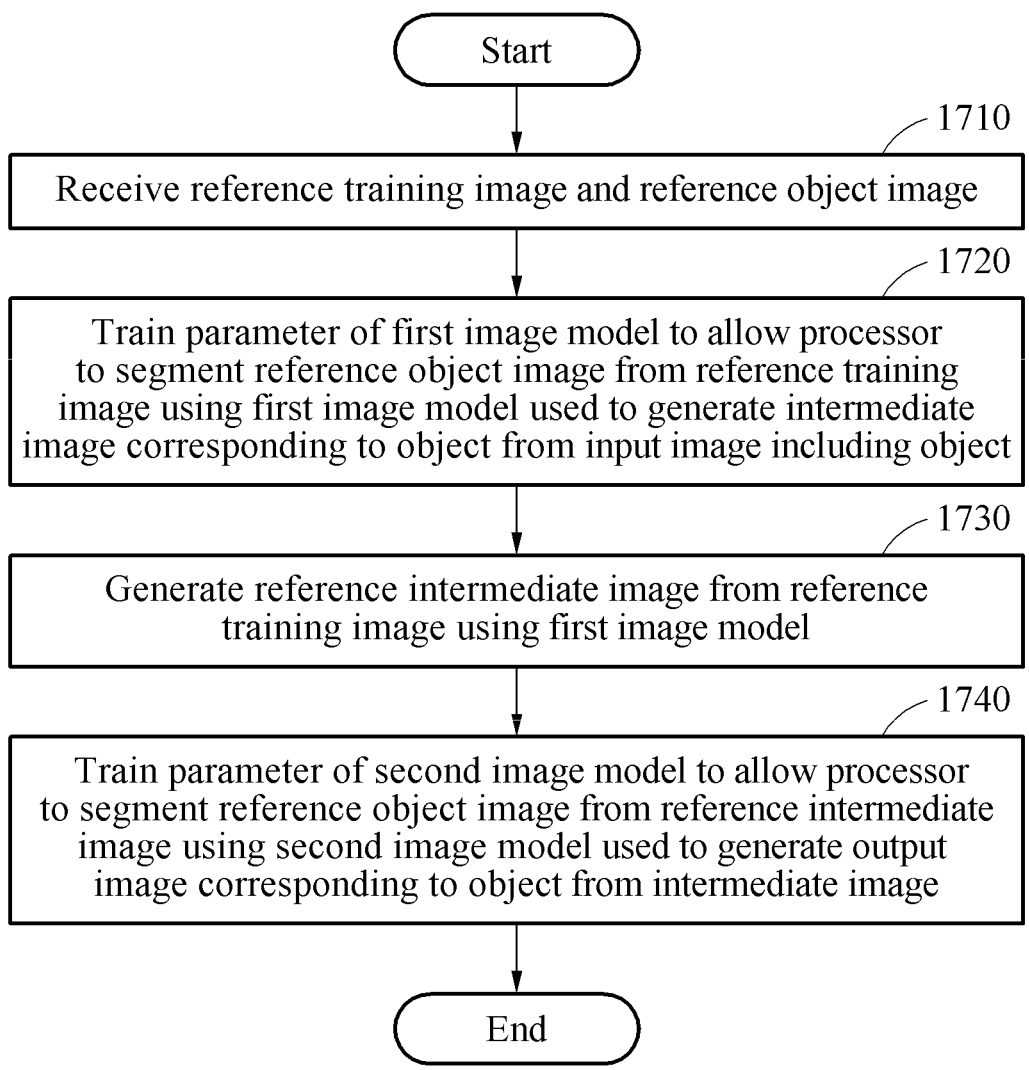
FIG. 17 is a flowchart illustrating another example of a method of training an image model used to segment an object from an image according to at least one example embodiment.

FIG. 17 is a flowchart illustrating another example of a method of training an image model used to segment an object from an image according to at least one example embodiment.

Referring to FIG. 17, in operation 1710, a model trainer of an image model training apparatus receives a reference training image and a reference object image. The reference training image is an image used as an input in training, and may be used to train a first image model. The reference object image is a preset image to be output with respect to the reference training image. The same reference object image may be used for training the first image model and a second image model. Training data may include a training pair including a reference training image and a reference object image to be mapped to the reference training image.

In operation 1720, the image model training apparatus trains a parameter of the first image model to allow a processor of an image model training apparatus to segment the reference object image from the reference training image using the first image model used to generate an intermediate image corresponding to an object from an input image including the object. For example, the training of the first image model may be performed through a process similar to the process described with reference to FIG. 13.

In operation 1730, the processor of the image model training apparatus generates a reference intermediate image from the reference training image using the first image model. The reference intermediate image is an image generated to train the second image model and may be mapped to the reference object image.

In operation 1740, the processor of the image model training apparatus trains a parameter of the second image model to allow the processor to segment the reference object image from the reference intermediate image using the second image model used to generate an output image corresponding to the object from the intermediate image. For example, the training of the second image model may be performed through a process that is the same as or, alternatively, similar to the process described with reference to FIG. 13. Here, the second image model may be trained to segment the reference object image from the reference intermediate image generated in operation 1730.

As described above, after the training of the first image model performed in operation 1720 is completed, the image model training apparatus may train the second image model in operation 1740 based on the reference intermediate image generated using the first image model for which the training is completed and based on the reference object image. However, at least some example embodiments are not limited thereto. Thus, while the first image model is being trained in operation 1720, the image model training apparatus may generate the reference intermediate image using the first image model for which the training is being performed in operation 1730 and train the second image model using the generated reference intermediate image in operation 1740. Thus, the training of the first image model for first object segmentation and the training of the second image model for second object segmentation may be performed concurrently, or performed separately.

The image model training apparatus 1300 illustrated in FIG. 13 may perform the method described with reference to FIG. 17.

Figure 18:
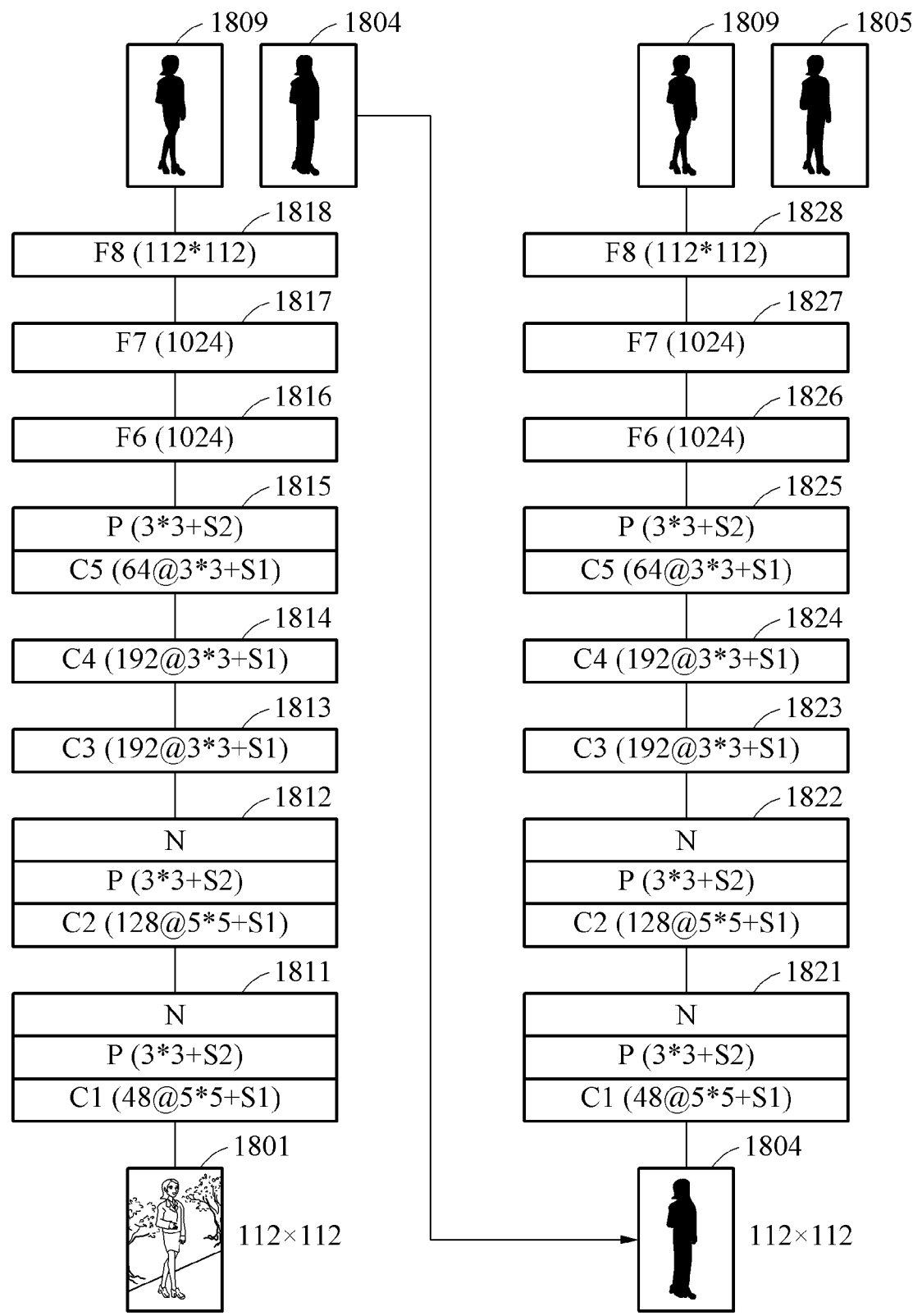
FIG. 18 is a diagram illustrating another example of a method of training an image model used to segment an object from an image according to at least one example embodiment.

FIG. 18 is a diagram illustrating another example of a method of training an image model used to segment an object from an image according to at least one example embodiment.

Referring to FIG. 18, a first layer 1811 through an eighth layer 1818 of a first neural network may be of the same structure as the first layer 1611 through the eighth layer 1618 of the first neural network illustrated in FIG. 16. Similarly, a first layer 1821 through an eighth layer 1828 of a second neural network illustrated in FIG. 18 may be of the same structure as the first layer 1621 through the eighth layer 1628 of the second neural network illustrated in FIG. 16.

As illustrated in FIG. 18, an image model training apparatus may train a first image model, for example, the first neural network of FIG. 18, to minimize an error (i.e., difference) between a reference intermediate image 1804 and a reference object image 1809 generated from a reference input image 1801 (or, alternatively, reduce the error below a threshold). A result from the first image model may be rough. Similarly, the image model training apparatus may train a second image model, for example, the second neural network, to minimize an error between an output image 1805 and the reference object image 1809 to be output from the reference intermediate image 1804. The output image 1805, which is a result from the second image model, may be finer than the result from the first image model.

Using the first image model and the second image model that are trained through two steps, an object segmenting apparatus may segment an object image from an input image more accurately.

The units and/or modules described herein may be implemented using hardware components and software components. For example, the hardware components may include microphones, amplifiers, band-pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A method of segmenting an object from an image, the method comprising:
    receiving an input image including an object and a background portion;
    generating an output image corresponding to the object from the input image using an image model; and
    extracting an object image from the output image such that the extracted object image includes the object and excludes the background portion,
    wherein the image model includes a neural network and is configured to generate the output image such that, for each output image pixel from among a plurality of output image pixels included in the output image,
        a pixel value of the output image pixel indicates a probability that a pixel, which is included in the input image and corresponds to the output image pixel, is included in the object and not included in the background portion.

2. The method of claim 1, wherein the extracting of the object image comprises:
    classifying a first plurality of pixels from among the plurality of output image pixels based on pixel values of the plurality of output image pixels; and
    extracting the object image using the classified pixels.

3. The method of claim 2, wherein the classifying comprises:
    comparing the pixel value of each pixel from among the first plurality of pixels to a threshold value; and
    determining an attribute of each pixel from among the first plurality of pixels based on a result of the comparing.

4. The method of claim 1, wherein the extracting of the object image comprises:
    generating a mask image by determining binary values for the plurality of output image pixels based on a result of comparing pixel values of the plurality of output image pixels in the output image to a threshold value.

5. The method of claim 4, wherein the extracting of the object image further comprises:
    generating a foreground image based on the mask image and the input image.

6. The method of claim 1, wherein the extracting of the object image comprises:
    generating a foreground image based on the output image by comparing pixel values of the plurality of output image pixels in the output image to a threshold value.

7. The method of claim 1, wherein the generating of the output image includes using the image model to generate the object image such that the object image has a resolution equal to that of the input image.

8. The method of claim 1 wherein,
    the neural network includes an activation function, and
    the activation function includes at least one nonlinear function.

9. A non-transitory computer readable medium storing instructions that, when executed by a processor, cause the processor to perform the method of claim 1.

10. An apparatus for segmenting an object from an image, the apparatus comprising:
    a memory storing an image model and computer-readable instructions; and one or more processors configured to execute the instructions such that the one or more processors are configured to receive an input image including an object and a background portion, generate an output image corresponding to the object from the input image using the image model, and extract an object image from the output image such that the extracted object image includes the object and excludes the background portion, wherein the image model includes a neural network and is configured to generate the output image such that for each output image pixel from among a plurality of output image pixels included in the output image,
        a pixel value of the output image pixel indicates a probability that a pixel, which is included in the input image and corresponds to the output image pixel, is included in the object and not included in the background portion.

11. The apparatus of claim 10, wherein the one or more processors are configured to execute the instructions such that the one or more processors are configured to classify a first plurality of pixels of the output image based on pixel values of the plurality of output image pixels, and extract the object image using the classified pixels.

12. The apparatus of claim 11, wherein the one or more processors are configured to execute the instructions such that the one or more processors are configured to compare the pixel value of each pixel from among the first plurality of pixels to a threshold value, and determine an attribute of each pixel from among the first plurality of pixels based on a result of the comparing.

13. The apparatus of claim 10, wherein the one or more processors are configured to execute the instructions such that the one or more processors are configured to generate a mask image by determining binary values for the plurality of output image pixels based on a result of comparing the pixel values of the plurality of output image pixels to a threshold value.

14. The apparatus of claim 13, wherein the one or more processors are configured to execute the instructions such that the one or more processors are configured to generate a foreground image based on the mask image and the input image.

15. The apparatus of claim 10, wherein the one or more processors are configured to execute the instructions such that the one or more processors are configured to generate a foreground image based on the output image by comparing pixel values of the plurality of output image pixels in the output image to a threshold value.

16. The apparatus of claim 10, wherein the one or more processors are configured to execute the instructions such that the one or more processors are configured to generate of the output image by using the image model to generate the object image such that the object image has a resolution equal to that of the input image.

17. The apparatus of claim 10 wherein,
the neural network includes an activation function, and
the activation function includes at least one nonlinear function.

18. A method of segmenting an object from an image, comprising:
receiving an input image including an object and a background portion;
generating an intermediate image corresponding to the object from the input image using a first image model;
generating an output image corresponding to the object from the intermediate image using a second image model; and
extracting an object image from the output image such that the extracted object image includes the object and excludes the background portion,
wherein the first image model includes a neural network and is configured to generate the intermediate image such that, for each intermediate image pixel from among a plurality of intermediate image pixels included in the intermediate image,
a pixel value of the intermediate image pixel indicates a probability that a pixel, which is included in the input image and corresponds to the intermediate image pixel, is included in the object and not included in the background portion.

* * * * *